United States Patent [19]

Misono et al.

[11] 4,056,306
[45] Nov. 1, 1977

[54] LIQUID CRYSTAL DISPLAY DEVICE AND METHOD OF MANUFACTURING THE SAME

[75] Inventors: Masayoshi Misono, Chosei; Masaharu Koayama; Tutomu Asida, both of Mobara, all of, Japan

[73] Assignee: Hitachi, Ltd., Tokyo, Japan

[21] Appl. No.: 722,437

[22] Filed: Sept. 13, 1976

[51] Int. Cl.² ............................................. G02F 1/13
[52] U.S. Cl. ............................ 350/160 LC; 228/121
[58] Field of Search ................. 350/160 LC; 228/121, 228/263, 903

[56] References Cited

FOREIGN PATENT DOCUMENTS 1,381,077  1/1975  United Kingdom .......... 350/160 LC

*Primary Examiner*—Edward S. Bauer
*Attorney, Agent, or Firm*—Charles E. Pfund

[57] ABSTRACT

The liquid crystal display device comprises a pair of spaced parallel insulating substrates, at least one of which being transparent, opposing electrodes formed on the inner surfaces of the substrates, a peripheral sealing member for sealing the peripheries of the substrates and provided with a filling port for filling a liquid crystal into a space between the substrates, a metal layer formed across the full width of the side surfaces of the substrates sandwiching the sealing member surrounding the filling port, and a solder layer formed on the metal layer to seal the filling port. The solder layer has an amount of 0.1 to 1.2mg/mm², and is formed by applying a molten solder ball having a predetermined weight.

5 Claims, 9 Drawing Figures

4,056,306

LIQUID CRYSTAL DISPLAY DEVICE AND METHOD OF MANUFACTURING THE SAME

BACKGROUND OF THE INVENTION

This invention relates to a liquid crystal display device and a method of manufacturing the same, more particularly to an improved construction of a filling port for filling a liquid crystal into the cell and a method of sealing the filling port.

A conventional liquid crystal display device comprises a sealed casing or a cell, opposed electrodes in the cell and a liquid crystal interposed between the opposing electrodes. When an operating voltage is impressed across the opposing electrodes, the optical characteristic of the liquid crystal varies at the portion impressed with the voltage thus displaying a desired digit, letter or symbol. Such liquid crystal display devices are now extensively used in table type electronic computers, wrist watches or the like. The cell comprises a pair of parallel transparent insulating substrates made of glass, for example, with the peripheries of the substrates spaced and sealed by a peripheral sealing member privoded with a filling port for the liquid crystal. However, the sealing of the filling port after the liquid crystal has been filled into the space defined by the insulating substrates and the peripheral sealing member involves a difficult problem. More particularly, the construction of the filling port sealing member must satisfy the following requirements. Since the liquid crystal is affected by moisture, the port sealing member should not permeate moisture. Secondly, since the liquid crystal has a large chemical affinity toward other substances, the port sealing member must be stable. Thirdly, since the liquid crystal decomposes at a high temperature the port sealing member must be applied at a low temperature. Fourthly, air bubbles should not be entrained in the cell. Fifthly, the port sealing member should have a large mechanical strength. Sixthly, the port sealing member should have a small size.

In the prior art liquid crystal display device, an organic substance has been used to seal the filling port. However, an organic substance can not fulfill the first requirement, that is the moisture impervious property. For this reason, it is desirable to use an inorganic substance as the filling port sealing agent. However, where glass, typically frit glass, is used as the filling port sealing agent it can not satisfy the requirements that the filling port sealing agent should withstand to high temperatures and that air bubbles should not be trapped in the cell. Accordingly, in recent years it has been proposed to use a solder as the filling port sealing agent. In order to assure a better bonding of the solder, a thin metal film acting as a prime coating and capable of manifesting a large bonding force to the solder is firstly formed about the periphery of the filling port extending through the sides of the insulating substrates and that of the peripheral sealing member. Although various metals and various methods of forming a thin film thereof may be used, where the substrates are made of glass, a nichrome layer and a thin metal layer overlying the same are formed by vacuum deposition technique and then the solder is applied to the metal layer. As will be described later with reference to the accompanying drawings, if the metal layer were formed on an arbitrary area and an arbitrary amount of the solder is applied onto the metal layer, the bonding strength of the filling port sealing agent would not be sufficient. For example, where an arbitrary area of the metal film and an arbitrary amount of the solder were used, when 40 environment tests are repeated at a temperature of −25° C to +25° C and at a relative humidity of 90%, due to the difference between the thermal expansion coefficients of the solder which may be considered as a rigid body and the insulating substrates, cracks are formed in the insulating substrates at portions thereof near the filling port, and the cracks grow as the number of tests is increased. For this reason, in the prior art liquid crystal display device, it has been inevitable to cause cracks in the substrates even when the solder is firmly bonded to the metal layer. Accordingly, the liquid crystal leaks to the outside of the cell thus making it difficult to maintain satisfactory sealing for the liquid crystal filling port.

SUMMARY OF THE INVENTION

Accordingly, it is an object of this invention to improve the reliability of the sealing construction for the liquid crystal filling port thus providing a liquid crystal display device having a long operating life.

Another object of this invention is to provide a method of forming an improved sealing construction for the liquid crystal filling port having an improved reliability.

According to one aspect of this invention, there is provided a liquid crystal display device comprising a pair of parallel insulating substrates spaced a predetermined spacing, at least one of the substrates being transparent, opposed electrodes formed on the opposing surfaces of the substrates, a peripheral sealing member for sealing the peripheries of the substrates for defining a space for accommodating a liquid crystal, means for defining a filling port at a portion of the peripheral sealing member for filling the liquid crystal into the space, a metal layer formed across the full width of the side surfaces of the substrates sandwiching the peripheral sealing member surrounding the filling port, and a solder layer applied onto the metal layer for sealing the filling port, the solder layer having an amount of 0.1 to 1.2mg/mm$^2$.

According to another aspect of this invention, there is provided a method of manufacturing a liquid crystal display device of the class comprising a pair of spaced parallel insulating substrates, at least one of the substrates being transparent, opposed electrodes formed on the opposing surfaces of the substrates, a peripheral sealing member for sealing the peripheries of the substrates and defining a space for accommodating a liquid crystal, and means for defining a filling port at a portion of the peripheral sealing member for filling the liquid crystal into the space, the method comprising the step of applying a single molten solder ball having a weight sufficient to form a solder seal having an amount of 0.1 to 1.2mg/mm$^2$ across the full width of the side surfaces of the substrates sandwiching the peripheral sealing member surrounding the filling port, thus sealing the same.

DESCRIPTION OF THE PREFERRED EMBODIMENTS

Figure 5:
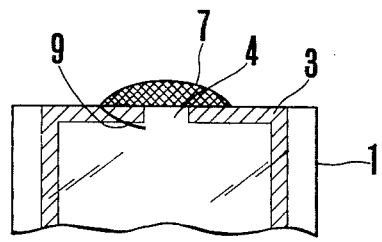
Figure 6:
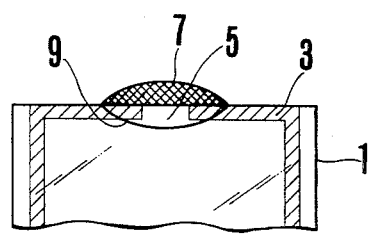

Before describing one embodiment of this invention, a typical construction of a liquid crystal display device will be described with reference to FIGS. 1 to 3 and then the manner of forming cracks in the substrates near the liquid crystal filling port will be described with reference to FIGS. 4, 5 and 6.

Figure 1:
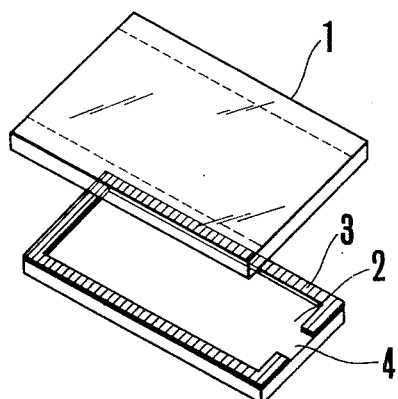
FIG. 1 is an exploded perspective view of one example of a liquid crystal display device to which the invention is applicable.
Figure 2:
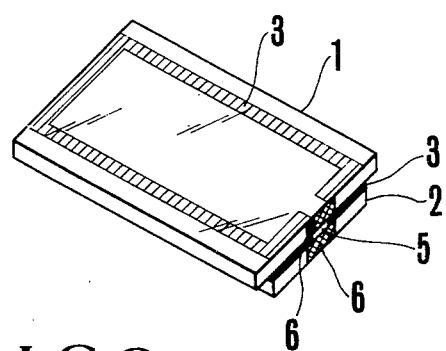
FIG. 2 is a perspective view of the liquid crystal display device shown in FIG. 1 after assembling.

As shown in FIG. 1, a conventional liquid crystal display device comprises a pair of parallel insulating substrates 1 and 2, at least one of the substrates being transparent, and transparent electrodes (not shown) formed on the opposing inner surface of respective substrates. The peripheries of the substrates 1 and 2 are sealed by a peripheral sealing member 3 which also acts to maintain the substrates at a definite spacing. Usually the peripheral sealing member is made of frit glass. A portion of the substrates is not formed with the peripheral sealing member and forms a filling port 4 for filling a liquid crystal. After sealing the peripheries of the substrates, metal film 6 is formed by vapor deposition or ion plating on the side surfaces of the substrates and of the peripheral sealing member about the filling port over a suitable area. Where the metal film 6 is formed by vapor deposition technique a mixture or alloy of nickel and chromium is firstly vapor deposited in a manner well known in the art. Then, the resulting layer contains chromium having lower evaporation temperature at the lower portion thereof and the content of nickel having higher evaporation temperature increases toward the upper portion of the layer. Chromium has a high adhesive to glass whereas nickel has a lower adhesive force to glass but has an excellent adhesive force to solder. For this reason, this layer is suitable as a prime coating for soldering. When gold is vapor deposited, not only the fluidity of the solder is improved but also oxidization of the vapor deposited layer can be prevented.

Figure 3:
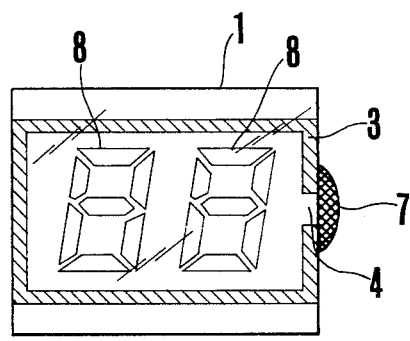
FIG. 3 is a plan view of the liquid crystal display device shown in FIG. 2.

FIG. 3 shows a plan view of a completed liquid crystal display device which is formed by filling a liquid crystal into the cell through the filling port 4 and then sealing the filling port by means of a suitable quantity of a solder 7. There are shown patterns 8 each comprising seven electrode segments which are selectively energized to display any one of the digits 0 to 9.

Figure 4:
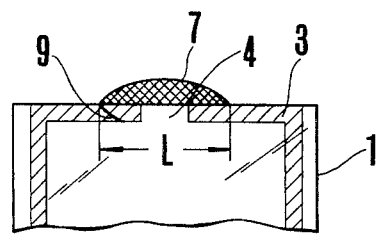
FIGS. 4, 5 and 6 are partial sectional views to explain the manner of forming cracks.

When the liquid crystal display device provided with a filling port sealing construction described above was subjected to an environment test (from −25° C to +75° C, relative humidity of 90%, number of test cycles 40) cracks 9 were formed near the filling port 4 as shown in FIG. 4. As the number of tests increased, the cracks 9 gradually grew as shown in FIGS. 5 and 6. Thus, in the prior art liquid crystal display device, cracks are inevitably formed notwithstanding good adhesion of the solder to the metal layer 6, thus causing leakage of the liquid crystal through the cracks.

Let us now consider the reason why the cracks are formed. Firstly, the thermal expansion of the liquid crystal applies a force directed to the outside to the solder 7 through the filling port 4. Considering the relative strength of the bonding force of the solder 7 and the peel off force applied to the peripheral sealing member caused by the thermal expansion of the liquid crystal, the former is larger than the latter. From this it can be concluded that the thermal expansion of the liquid crystal does not cause cracks.

As a second reason, the fact that the glass substrates 1 and 2 are rendered brittle by the heat shock occuring at the time of applying the solder 7 to the metal film 6 may be considered. However, even when the temperature of the soldering iron is increased or the time of soldering is increased, no special change was noted in the substrates 1 and 2. Accordingly, such heat shock does not cause cracking.

Considering the difference in the thermal expansion coefficients of the solder and the glass substrates, when the solder 7 comprises a eutectic solder consisting of 37% lead and 63% tin, its thermal expansion coefficient is about $270 \times 10^{-7}/°C$ and when ordinary soda glass is used as the substrates, its thermal expansion coefficient is about $90 \times 10^{-7}/°C$. Since the eutectic solder has a melting point of about 184° C, the applied solder solidifies at this temperature. The applied solder is assumed to have a length L as shown in FIG. 4. When the liquid crystal display element is cooled to −16° C, the eutectic solder having length L contracts according to its thermal expansion coefficient for the temperature difference of about 200° C. Assume now that the portion of the glass having a corresponding length L contracts without any rectriction according to its thermal expansion coefficient for the temperature difference of 200° C, the ratio of the length of the glass to that of solder after contraction amounts to about 1.0036.

At room temperature, glass has a Youngs modulus of 5000 to 8000 kg/mm² and a tensile strength of 4 to 15 kg/mm². Calculating the maximum elongation of the glass within its elastic limit, the glass elongates by a factor of 1.003 at the maximum. For this reason, if the glass substrates 1 and 2 and the solder 7 are bonded together perfectly and the solder 7 is assumed to be a perfect rigid body, a stress is concentrated at the interface (particularly, the periphery of the solder 7 because of the glass substrate having a far broader area) between the solder 7 and the glass substrates 1 and 2. As a result, due to the fact that glass is usually more sensitive to a tensile stress than metal, cracks 9 are inevitably created which start from the interface. Actually, however, since the solder is not a perfect rigid body but a soft alloy having a high extensibility so that when the solder tends to contract upon temperature decrease, the solder will be pulled by the glass substrates having smaller thermal expansion coefficient with the result that the solder will be elongated slightly than a case where it is not applied with any restrictive force. If the force created in the substrate and contributing to the elongation were smaller than the rupturing force of the substrate, no crack would be formed.

In this manner, the occurrence of cracks in the glass substrate or substrates depends on such factors as a force necessary for elongating the solder applied on the glass substrates and a tensile strength, against tensile breakage, of the glass substrates, these factors being determined by the dimension and quantity of the solder applied.

As the amount of the solder applied to the metal layers decreases, the rigidity of the solder decreases. Accordingly, in order to make the force required to elongate the solder smaller than the rupturing force of the substrates, the amount of the solder utilized to seal the filling port should be decreased. The correspondence between said force of elongation and the amount of the solder can be determined by theoretical calculation, but experimentally, by measuring the correlation between the amount of solder and the breakage of sealing construction due to environment tests.

Figure 7:
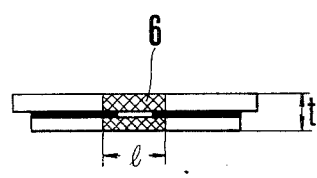
FIG. 7 is a sectional view of a liquid crystal display device embodying the invention.
Figure 8:
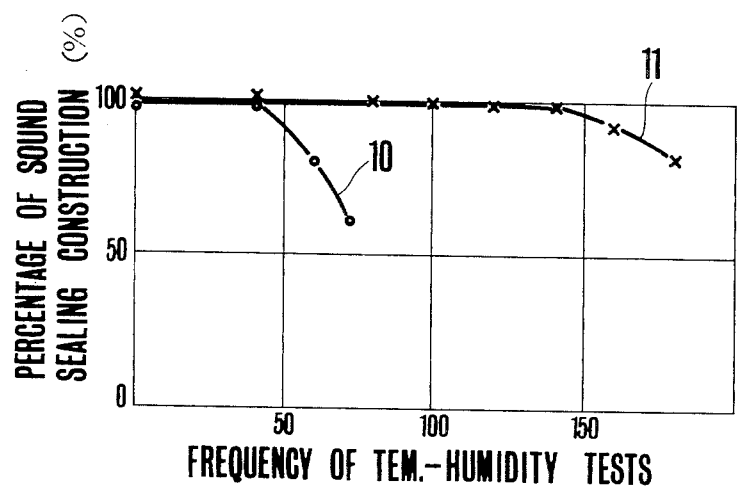
FIG. 8 is a graph showing the relationship between the number of temperature and moisture tests and the percentage of sound sealing construction for the liquid crystal filling port.

FIG. 7 shows the dimension of the metal layer 6 or the prime coating for the solder film utilized to seal the filling port. In general, the thickness of the peripheral sealing member 3 used for liquid crystal display devices is 4 to 15 microns and that of each glass substrate is about 0.7mm, so that the thickness of the peripheral sealing member 3 can be neglected. Accordingly, the overall thickness of the cell can be considered as approximately 1.4mm. Since the length $l$ is usually about 4 to 5 mm, the area of the prime coating is about (4 to 5) $\times$ 1.4 mm$^2$. Display cells provided respectively with 2.4mg/mm$^2$ and 1.2mg/mm$^2$ of solder soldered on a definite area ($l = 5$mm) of the prime coating were subjected to an environment test (temperature of $-25°$ C to $+75°$ C, relative humidity of 90%) and obtained a result as shown in FIG. 8 in which the abscissa represents the frequency of the temperature - humidity test and the ordinate the percentage of the sound cells remaining intact after the test. In FIG. 8, curve 10 shows the result of the test for the cells utilizing 2.4mg/mm$^2$ of solder and curve 11 shows that of the cells utilizing 1.2mg/mm$^2$ of solder. With 0.5mg/mm$^2$ of solder, no cracks were created. This fact proves that an average quantity of solder of less than 1.2mg/mm$^2$ greatly improves the withstandability of the liquid crystal sealing construction against the cracks which would be created in the neighbourhood of the liquid crystal filling port. The smaller is the average amount of the solder, the better become results. Actually, the amount of the solder can be decreased to a lower limit of about 0.1mg/mm$^2$, but 0.3mg/mm$^2$ is preferred from the standpoint of the easiness of the soldering operation. From the above facts, the average amount of solder advantageously ranges from 0.1mg/mm$^2$ to 1.2mg/mm$^2$. It was found that there is no limitation on the composition of the solder.

To obtain a solder seal having an average amount of 0.1 to 1.2mg/mm$^2$, the amount of the solder required to form the solder seal having an average amount of 0.1 to 1.2mg/mm$^2$ on the prime coating having the area of (4 to 5) $\times$ 1.4mm$^2$ is predetermined. Since solder balls of known weight are available on the market, it is easy to form the solder seal of the required amount by using one solder ball for each sealing operation. However, it should be understood that the invention is not limited to the use of solder balls and any other method can be used provided that it can form the solder seal having the average amount.

Figure 9:
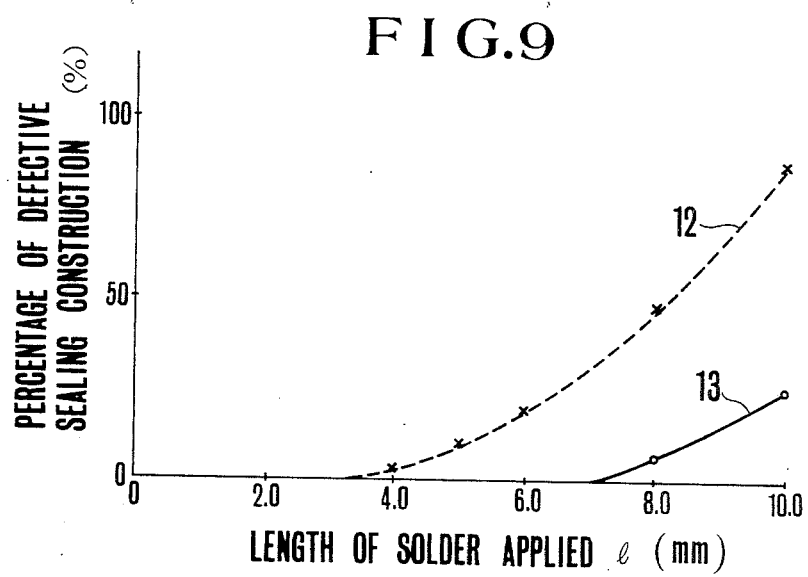
FIG. 9 is a graph showing the relationship between the length of a prime coating and the percentage of defective sealing construction.

The relation between the length of the solder applied and the percentage of defective sealing construction was obtained through environment tests of fifty temperature-humidity cycles, as shown in FIG. 9 in which the abscissa represents the length of the solder applied and the ordinate the percentage of deflective sealing construction. In FIG. 9, curve 12 shows the result of the test for the cells utilizing 2.4mg/mm$^2$ of solder and curve 13 shows that of the cells utilizing 1.2mg/mm$^2$ of solder. From this graph, it will be seen that the tendency to occurrence of the cracks is accelerated as the length of the solder increases. The actual conditions for usage of the cells are not so severe as the environment tests and therefore, the cells utilizing 1.2mg/mm$^2$ solder applied over 10mm length are satisfactory for practical use.

As has been described hereinabove according to this invention, the port for filling the liquid crystal is sealed by solder of an amount within a range of 0.1 to 1.2mg./mm$^2$ so that the force required to elongate the solder becomes smaller than the rupturing force of the substrates, thereby effectively preventing the formation of the cracks in the substrates near the filling port. Consequently, the liquid crystal display element of this invention can withstand severe operating conditions including large variations in the environment temperature and humidity, thus increasing the reliability and life.

What is claimed is:

1. A liquid crystal display device comprising a pair of parallel insulating substrates spaced a predetermined spacing, at least one of the substrates being transparent, opposed electrodes formed on the opposing surfaces of said substrates, a peripheral sealing member for sealing the peripheries of said substrates for defining a space for accommodating a liquid crystal, means for defining a filling port at a portion of said sealing member for filling the liquid crystal into said space, a metal layer formed across the full width of the side surfaces of said substrates sandwiching said peripheral sealing member surrounding said filling port, and a solder layer applied onto said metal layer for sealing said filling port, said solder layer having an amount of 0.1 to 1.2mg/mm$^2$.

2. The liquid crystal display device according to claim 1 wherein the amount of the solder and the area of the metal layer are selected such that the force required to elongate the solder due to the difference in the thermal expansion coefficients of the solder and the substrates is smaller than the rupturing force of said substrates.

3. A method of menufacturing a liquid crystal display device of the class comprising a pair of spaced parallel insulating substrates, at least one of the substrates being transparent, opposed electrodes formed on the opposing surfaces of said substrates, a peripheral sealing member for sealing the peripheries of said substrates and defining a space for accommodating a liquid crystal, and means for defining a filling port at a portion of said peripheral sealing member for filling the liquid crystal into said space, said method comprising the step of applying a single molten solder ball having a weight sufficient to form a solder seal having an amount of 0.1 to 1.2mg/mm$^2$ across the full width of the side surfaces of said substrates sandwiching said peripheral sealing member surrounding said filling port, thus sealing the same.

4. The method according to claim 3 which further comprises the step of forming a metal layer across the full width of the side surfaces of said substrates sandwiching said peripheral sealing member surrounding said filling port prior to the application of said solder seal.

5. The method according to claim 4 wherein said metal layer is formed by vapor deposition of a mixture of alloy of nickel and chromium.

* * * * *